United States Patent
Ocher et al.

(10) Patent No.: US 10,754,973 B2
(45) Date of Patent: Aug. 25, 2020

(54) SECURE CLOUD STORAGE SYSTEM

(71) Applicant: SAP SE, Walldorf (DE)

(72) Inventors: Alexander Ocher, San Francisco, CA (US); Viktor Lapitski, San Francisco, CA (US)

(73) Assignee: SAP SE, Walldorf (DE)

( * ) Notice: Subject to any disclaimer, the term of this patent is extended or adjusted under 35 U.S.C. 154(b) by 281 days.

(21) Appl. No.: 15/872,336

(22) Filed: Jan. 16, 2018

(65) Prior Publication Data

US 2019/0220618 A1    Jul. 18, 2019

(51) Int. Cl.
| | | |
|---|---|---|
| *G06F 21/62* | (2013.01) | |
| *H04L 9/06* | (2006.01) | |
| *H04L 9/08* | (2006.01) | |
| *H04L 9/14* | (2006.01) | |
| *H04L 9/32* | (2006.01) | |

(52) U.S. Cl.
CPC ........ *G06F 21/6227* (2013.01); *H04L 9/0618* (2013.01); *H04L 9/0643* (2013.01); *H04L 9/0863* (2013.01); *H04L 9/14* (2013.01); *H04L 9/3226* (2013.01); *H04L 9/3239* (2013.01); *H04L 2209/30* (2013.01)

(58) Field of Classification Search
CPC . G06F 21/6227; H04L 9/0618; H04L 9/0643; H04L 9/0863; H04L 9/14; H04L 9/3226; H04L 9/3239
See application file for complete search history.

(56) References Cited

U.S. PATENT DOCUMENTS

| | | | |
|---|---|---|---|
| 8,811,620 B2 | 8/2014 | Chaves et al. | |
| 9,087,205 B2 | 7/2015 | Kremp et al. | |
| 9,253,166 B2 | 2/2016 | Gauda | |
| 9,356,782 B2 | 5/2016 | Kitze et al. | |
| 2010/0332401 A1* | 12/2010 | Prahlad | G06F 3/0649 705/80 |
| 2011/0022642 A1* | 1/2011 | deMilo | G06F 21/602 707/805 |
| 2016/0239683 A1 | 8/2016 | Gujral et al. | |
| 2017/0103085 A1* | 4/2017 | Kataoka | G09C 1/00 |
| 2017/0104736 A1 | 4/2017 | Seul et al. | |

FOREIGN PATENT DOCUMENTS

| | | |
|---|---|---|
| KR | 2014-0088967 A | 7/2014 |
| WO | WO 2017/153833 A1 | 9/2017 |

* cited by examiner

*Primary Examiner* — Tongoc Tran
(74) *Attorney, Agent, or Firm* — Sterne, Kessler, Goldstein & Fox P.L.L.C.

(57) ABSTRACT

Disclosed herein are system, method, and computer program product embodiments for a secured cloud storage system. An embodiment operates by receiving a compressed file comprising data that has been compressed using a compression algorithm. The compressed data is divided into a plurality of separate files. A password for each of the separate files is determined. Each of the separate files is encrypted with its corresponding password. The encrypted files are stored across a plurality of servers.

20 Claims, 3 Drawing Sheets

SECURE CLOUD STORAGE SYSTEM

BACKGROUND

Storing data on the cloud enables data to be accessible from multiple computing devices simultaneously. However, with the multiple computing devices or ports of entry to the data, it is important to secure the data against hackers and other unauthorized access.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a secure cloud storage system. This disclosure describes embodiments that are improvements in data protection technology that significantly increases the security compared to existing implementations.

Figure 1:
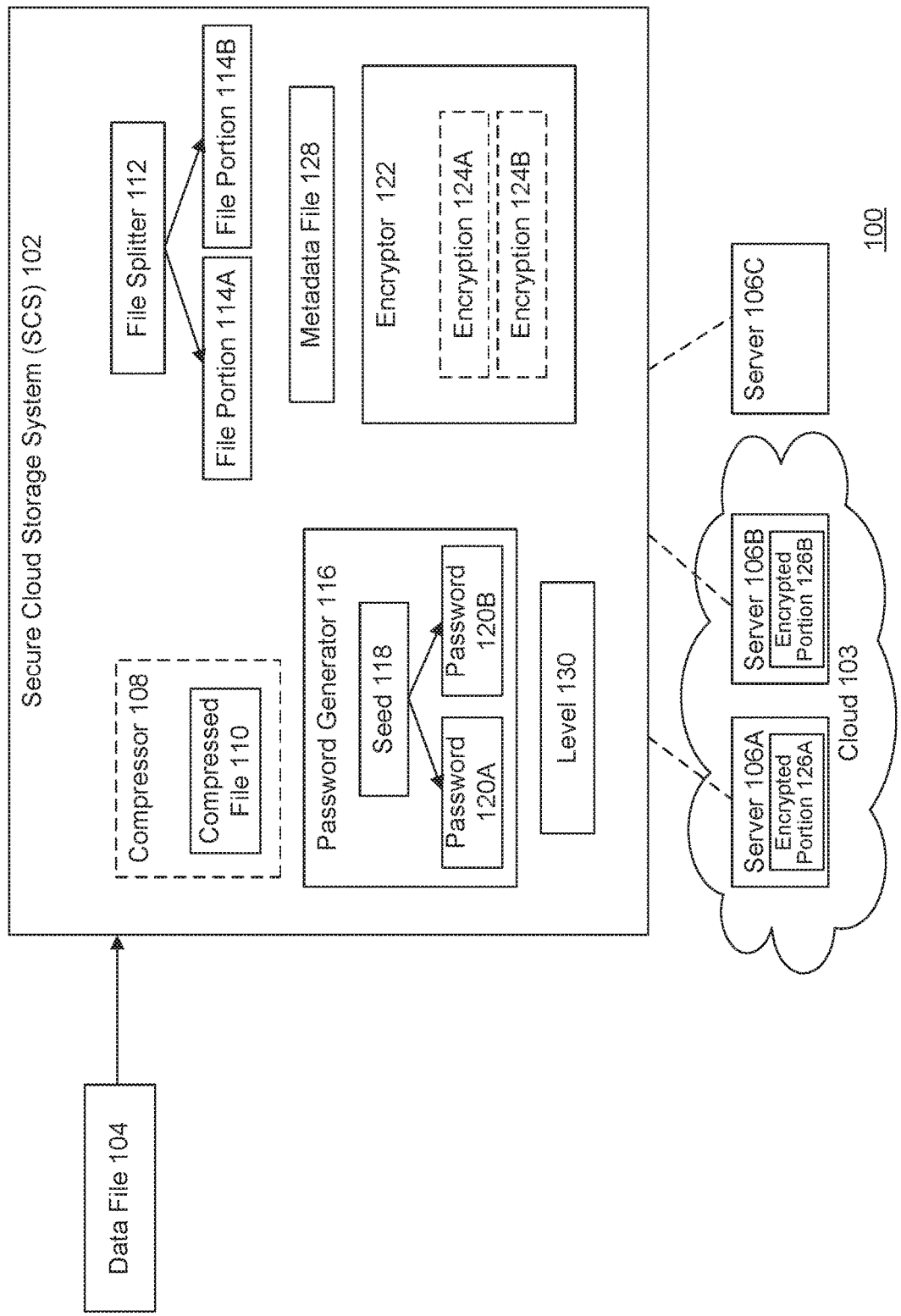
FIG. 1 is a block diagram illustrating a secure cloud storage system, according to some embodiments.

FIG. 1 is a block diagram 100 illustrating a secured cloud storage system, according to some embodiments. A secure cloud storage system (SCS) 102 may provide secure storage of data 104 on a cloud computing system 103. Cloud storage or computing system 103 may include multiple servers or other computing devices 106, often in multiple locations, across which data is stored and made available to requesting and authorized computing devices such as desktops, mobile phones, laptops, wearables, appliances, internet of things (IoT) devices, and tablet computing devices, to name just some examples.

One advantage of cloud 103 is that data stored on servers 106A, 106B may be accessible from multiple different devices, distributed across geographic locations, simultaneously. However, having multiple ports of access to the data also creates a security risk in that it allows greater opportunities for hackers and other unauthorized users to try and gain access to sensitive or confidential data. SCS 102 employs various security measures to help mitigate or eliminate these risks. Which security measures are employed may vary based on what type of data is being stored or secured on different computing devices of cloud 103. SCS 102 may provide more sensitive data with greater security, while less sensitive data is provided less security, thus improving processing throughput while maintaining data security.

SCS 102 may receive a data file 104 including data that is to be stored on cloud 103. Data file 104 may include any collection of data, objects or information to be stored on cloud 103. Data file 104 may include multiple data files. In an embodiment, data file 104 may include updated information or an updated file that is being used to replace an existing file or other information stored across one or more servers 106 on cloud 103.

In an embodiment, data file 104 may be received in an uncompressed or unsecured format. A compressor 108 may compress data file 104 to generate compressed file 110. In an embodiment, compressor may select from any number of different compression algorithms to apply to data file 104 to generate compressed file 110. If multiple files are received as part of data file 104, then compressor 108 may apply different compression algorithms to each file to generate multiple compressed files 110. Or, in an embodiment, a single compression algorithm could be applied to all the data files 104 and be used to generate a single compressed file 110.

In an embodiment, compressing the file may add a layer of data security to SCS 102. Because for example, in order to access the data of compressed file 110, a user must know which compression algorithm(s) was used to compress data file 104. In an embodiment, this compression information or metadata may be included in a control file or metadata file 128, which is discussed in greater detail below.

However, not every file 104 may be compressed. In an embodiment, compressed file 110, as used herein, may refer to files which exist in binary form (with or without compression), such as a JPEG file. Other types of files, such as text files, may be compressed or otherwise converted into binary. In an example embodiment, base64 encoding may be used.

A file splitter 112 may partition or split the compressed file 110 into multiple sub-files or file portions 114A, 114B. File splitter 112 may select and separate different bytes or bits of compressed file 110 into multiple sub-files 114. In an embodiment, file splitter 112 may randomly select a number of files 114 into which to divide compressed file 110. Using a random number to determine how many files into which to split compressed file 110 may add another layer of security in that an unauthorized user would need to know how many different files to locate to acquire the data of data file 104.

File splitter 112 may use any number of file splitting algorithms to split compressed file 110 into file portions 114A, 114B. For example, compressed file 110 may include a series of bits. Then, for example, file splitter 112 may move every first bit into file portion 114A and every second bit into a separate file portion 114B. Or for example, if three file portions 114 were being generated, then file splitter 112 may move every third bit into each of the three file portions. Though only two file portions 114 are shown, in other embodiments, compressed file 110 may be split into any different number of portions 114. In other embodiments, other division or splitting algorithms may be used for determining which bits, portions, bytes, or chunks of data from compressed file 110 are included in which file portions 114.

One benefit of using independent encryption of file portions 114 may be that after splitting the original file (e.g., compressed file 110 or data file 104) into portions 114, subsequent operations may be performed on the various portions in parallel. In an embodiment, splitting the compressed file 110 may add a layer of data security to SCS 102. Because for example, in order to access the data of compressed file 110, a user may need to know how compressed file 110 was split or partitioned into file portions 114. Further, the user may have to identify how many and which file portions 114 correspond to which compressed file 110.

In an embodiment, this file splitting information or metadata may be stored as part of the same or a different metadata file 128.

A password generator 116 may generate passwords 120A, 120B based on a seed value 118. Seed 118 may be an original password or data value that is used by password generator 116 to generate passwords 120. In an embodiment, seed 118 may be received from a user. For example, a user who is uploading data file 104 may provide an initial password or seed value 118.

In another embodiment, seed 118 may be auto-generated by password generator 116 without user input. For example, seed 118 may be a value corresponding to the date and time data file 104 was created or received. In an embodiment, seed 118 may include the date and time value after it is put through a random value generator. Seed 118 may be any initial alpha-numeric or other data value that is used to generate one or more passwords 120.

Passwords 120 may include values that are generated based on seed 118. In an embodiment, passwords 120 may include simple appendages to a seed password value 118. For example, if seed 118 has the value "March2018," password 120A may be "March2018a", and password 120B may be "March2018b." In an embodiment, the various passwords 120A, 120B may correspond to the generated file portions 114A, 114B. In an embodiment, each password 120 may then be hashed.

In another embodiment, an initial seed may be "April2018." Then, for example, password generator 116 may change the value by changing, appending, removing or otherwise modifying several of the characters. For example, a changed seed may be "April201." This changed seed may then be hashed. Then, the hashed value of the changed seed may then be broken down into passwords 120A, 120B. For example, the first 20 characters of the hashed value may be used as password 120A, and the second 20 characters may be used for password 120B. Or, for example, a user may decide which characters to use for each password, such as using characters 3-20 for password 120A and characters 47-62 for password 120B.

In an embodiment, the password generator 116 information may add a layer of data security to SCS 102. Because, for example, in order to access the data of file portions 114A, 114B, a user (including an unauthorized user or potential attacker) may need to know which passwords 120 corresponds to which file portions 114. This task may be made more difficult if the password values are hashed. In an embodiment, this password generation information or metadata, such as seed 118, may be stored as part of the same or across different metadata files 128.

In an embodiment, if passwords are automatically generated, they may be stored in a database. For example, though metadata file 128 is referred to as a file, in an embodiment, metadata file 128 may include a database, multiple files, or a file and a database. For example, metadata file 128 may refer to a control file where metadata information is stored, and a record (column or row) or table of a database where security information, such as a password, is stored. To enhance security, the password information may be stored (and encrypted) separately from other metadata or security information. In an embodiment, a control file database may include ownership information about data file 104, accesses information for different users. In another embodiment, to further enhance security, a portion (such as the first couple of bytes) of each file partition 114 may be stripped and stored separately in the database.

An encryptor 122 may encrypt the file portions 114A, 114B with their respective passwords 120A, 120B using one or more encryption algorithms 124A, 124B. In an embodiment, encryptor 122 may use different encryption algorithms 124 for each file portion 114. Encryptor 122 may generate encrypted portions 126.

In an embodiment, to improve or increase the reliability and availability of data, SCS 102 may store duplicate parts in different places to increase reliability without decreasing security. For example, encrypted portions 126 may then be stored across various servers 106A, 106B of cloud 103. In an embodiment, no one particular server 106 may include all the encrypted portions 126 of data file 104. For example, if data file 104 was divided into three encrypted portions 126, server 106A may include the first and second encrypted portions 126, and server 106B may include the first and third or second and third encrypted portions 126. However in some embodiments, to increase data security, no server 106 of cloud 103 may store all three encrypted portions 126.

In an embodiment, the encryption information from encryptor 122 may add a layer of data security to SCS 102. Because, for example, in order to access the data of file portions 114A, 114B, a user must know not only know which passwords 120 correspond to which file portions 114, but also which encryption algorithm 124 was used for which file portion 114. Furthermore, by not storing all of the encrypted portions 126A on a single server 106 of cloud 103, SCS 102 may provide an additional level of security because if an unauthorized user gains unauthorized access to server 106B and encrypted portion 126B, the unauthorized user would still not have access to all of the information or data of data file 104 (which is stored on server 106A). In an embodiment, this encryption and encryption portion storage location information or metadata may be stored as part of the same or across different metadata files 128.

To add an additional level of security, SCS 102 may store the metadata file(s) 128 across one or more computing devices or servers 106C that are not part of the same cloud 103 where encrypted portions 126 are stored. In an embodiment, server 106C may be part of a separate computing system which may not be accessible to computing devices 106 operating on cloud 103.

SCS 102 may provide many different layers of security by which to store data from one or more data files 104 in a cloud storage system 103. In an embodiment, data may be assigned a security level 130 based on the importance or sensitivity of the data. SCS 102 may correspond to different selections or combinations of security features as discussed herein to different security levels 130. By being able to manage which security features apply to which security levels 130, SCS 102 improves computer processing by enabling for customized data security for a wide range of data, while reducing the processing time and resources required to provide the indicated security for the data of each level 130.

In an embodiment, data file 104 may include an update to a previously received, stored, partitioned, and/or encrypted data file 104 or other information. For security reasons, an update to a file may delete all previous parts of the old file stored in cloud environments and then apply the same process (as was previously applied to the earlier file) to store the updated file with newly generated passwords.

Figure 2:
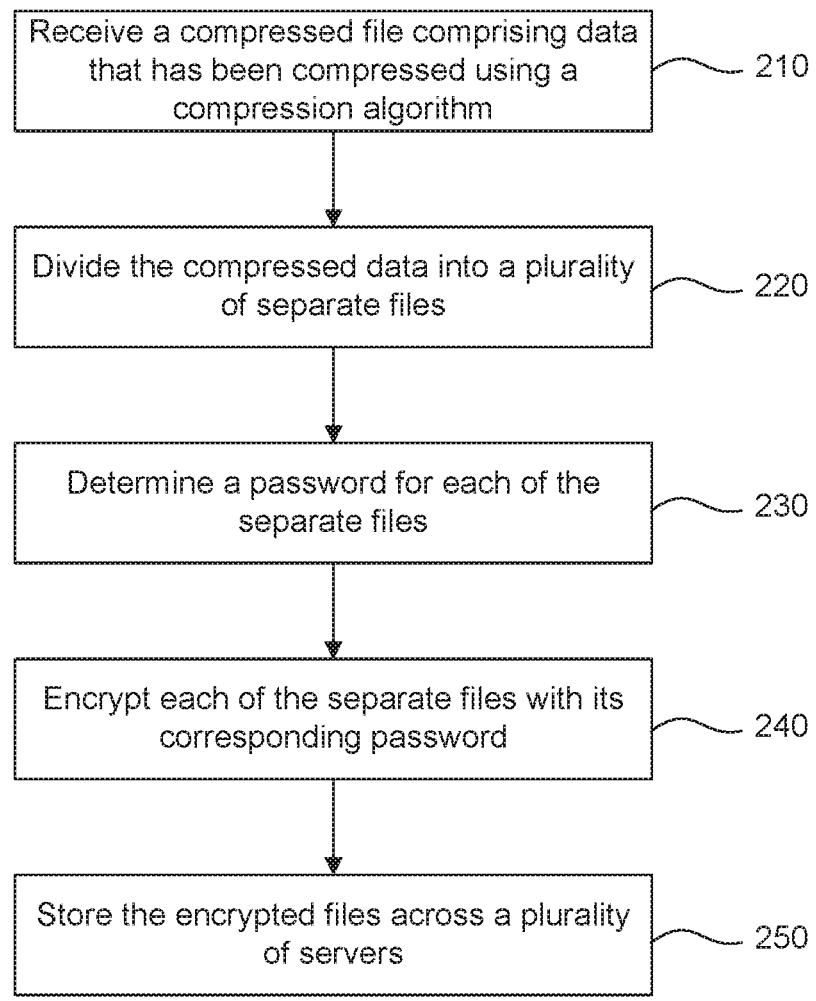
FIG. 2 a flowchart illustrating example operations for providing a secure cloud storage, according to some embodiments.

FIG. 2 is a flowchart for a method 200 for message handling related to non-parallelizable functionality, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 300 is not limited to the example embodiments.

In 210, a compressed file comprising data that has been compressed using a compression algorithm is received. For example, SCS 102 may receive data file 104 which may have been previously compressed as compressed file 110. In an embodiment, a user may encrypt the data of the file prior to or as part of the compression. In another embodiment, compressor 108 may compress one or more data files 104 into one or more compressed files 110. In an embodiment, a single data file 104 may be separate and compressed into multiple compressed files 110.

In 220, the compressed data is divided into a plurality of separate files. For example, file splitter 112 may divide or partition compressed file 110 into multiple file portions 114. Each file portion 114 may include one or more bits or bytes of compressed file 110.

In 230, a password is determined for each of the separate files. For example, password generator 116 may generate passwords 120 which may be used to encrypt the various file portions 114 from a seed 118. Seed value 118 may be an initial password provided by a user or may be auto-generated using one or more values that are provided into a random value generator.

In 240, each of the separate files is encrypted with its corresponding password. For example, encryptor 122 may encrypt the various file portions 114 using the various passwords with different encryption algorithms. In an embodiment, encryptor 122 may randomly select, or use another algorithm, to determine which file portions 114 are encrypted with which encryptions 124. In an embodiment, encryptor 122 may periodically change the encryptions 124 being used.

In 250, the encrypted files are stored across a plurality of servers. For example, encrypted portion 126A may be stored on server 106A while encrypted portion 126B may be stored on server 106B. In an embodiment, metadata file 126, which may be used to reassemble the data of data file 104 when it is requested by an authorized user or device, may be stored on a separate computing system or server 106C separate from cloud 103. Further, compressor 108, file splitter 112, password generator 116, and encryptor 122 may each be operating on different computing devices which may or may not be part of cloud 103.

Figure 3:
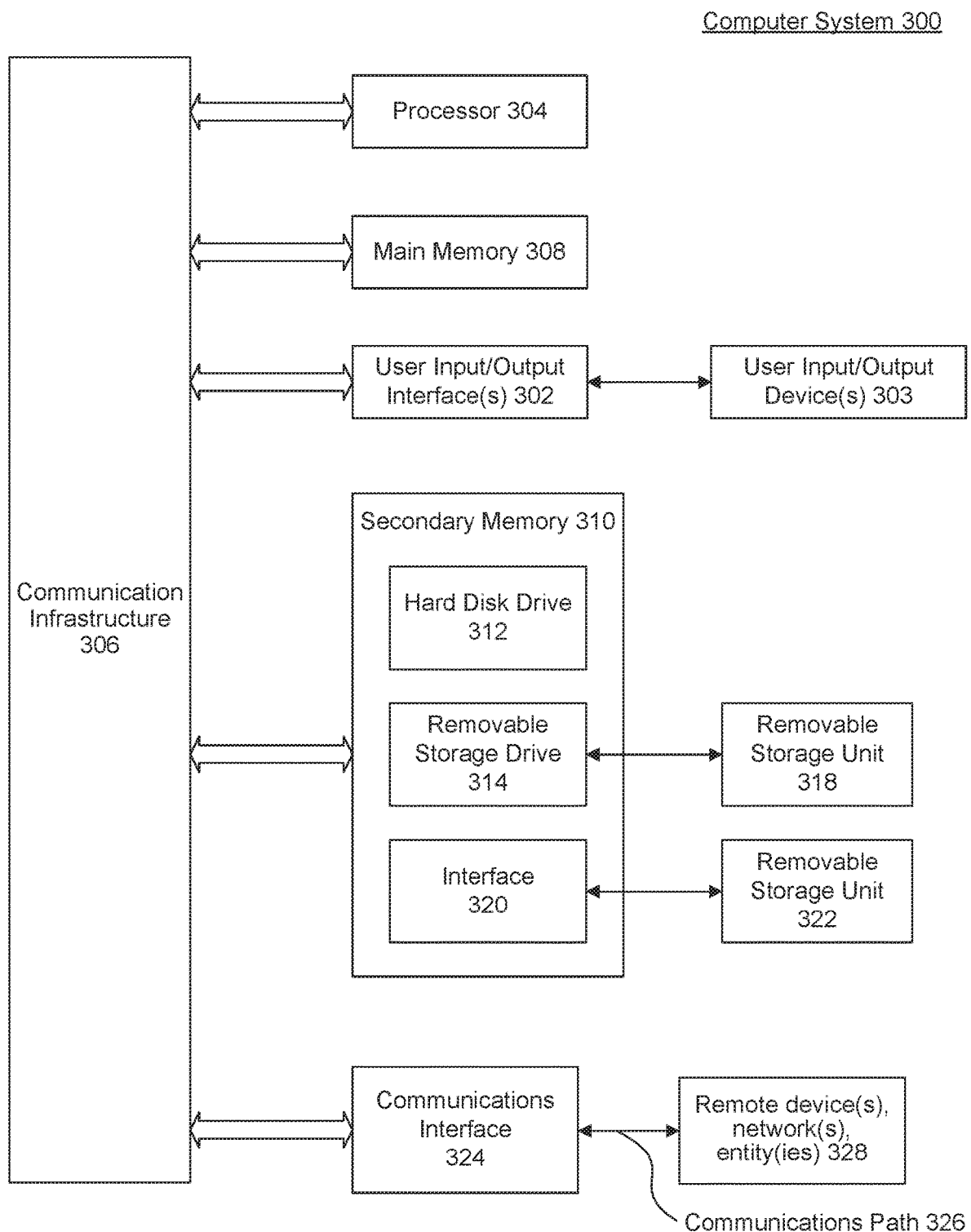
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.), and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving a compressed file comprising a series of bits corresponding data that has been compressed using a compression algorithm;
determining a number of separate files into which to divide the compressed file;
dividing the compressed file into a plurality of bit sequences, wherein a length of each bit sequence corresponds to the number of separate files, and wherein one bit from each bit sequence is sequentially divided into each of the separate files;
repeating the dividing until all of the bits of the compressed file from each of the bit sequences are sequentially divided amongst the number of separate files;
determining a password for each of the separate files;
encrypting each of the separate files with its corresponding password; and
storing the encrypted files across a plurality of servers, wherein each server only includes a portion of the compressed data.

2. The method of claim 1, wherein the encrypting comprises:
selecting a first one of a plurality of encrypting schemes for a first one of the plurality of separate files.

3. The method of claim 2, further comprising:
selecting a second one of the plurality of encrypting schemes, different from the first encrypting scheme, for a second one of the plurality of separate files;
encrypting the first file with the first encrypting scheme; and
encrypting the second file with the second encrypting scheme.

4. The method of claim 1, wherein the determining the password comprises:
receiving the password from a user.

5. The method of claim 4, further comprising:
generating, based on the received password, a unique password for each of the separate files.

6. The method of claim 5, further comprising:
hashing each of the unique passwords.

7. The method of claim 1, further comprising:
generating a control file including metadata for retrieving the compressed data from the received file, including a location identifying where each of the encrypted files is stored.

8. The method of claim 7, further comprising:
storing the control file on a computing device different from the plurality of servers where the encrypted files are stored.

9. A system, comprising:
a memory; and
at least one processor coupled to the memory and configured to:
receive a compressed file comprising a series of bits corresponding data that has been compressed using a compression algorithm;
determine a number of separate files into which to divide the compressed file;
divide the compressed file into a plurality of bit sequences, wherein a length of each bit sequence corresponds to the number of separate files, and wherein one bit from each bit sequence is sequentially divided into each of the separate files;
repeat the dividing until all of the bits of the compressed file from each of the bit sequences are sequentially divided amongst the number of separate files;
determine a password for each of the separate files;
encrypt each of the separate files with its corresponding password; and
store the encrypted files across a plurality of servers, wherein each server only includes a portion of the compressed data.

10. The system of claim 9, wherein the at least one processor that encrypts is configured to:
select a first one of a plurality of encrypting schemes for a first one of the plurality of separate files.

11. The system of claim 9, wherein the at least one processor is further configured to:
select a second one of the plurality of encrypting schemes, different from the first encrypting scheme, for a second one of the plurality of separate files;
encrypt the first file with the first encrypting scheme; and
encrypt the second file with the second encrypting scheme.

12. The system of claim 9, wherein the at least one processor that determines the password is configured to:
receive the password from a user.

13. The system of claim 12, wherein the at least one processor is further configured to:
generate, based on the received password, a unique password for each of the separate files.

14. The system of claim 13, wherein the at least one processor is further configured to:
hash each of the unique passwords.

15. The system of claim 9, wherein the at least one processor is further configured to:
generate a control file including metadata for retrieving the compressed data from the received file, including a location identifying where each of the encrypted files is stored.

16. The system of claim 15, wherein the at least one processor is further configured to:
store the control file on a computing device different from the plurality of servers where the encrypted files are stored.

17. A non-transitory computer-readable device having instructions stored thereon that, when executed by at least one computing device, cause the at least one computing device to perform operations comprising:
receiving a compressed file comprising a series of bits corresponding data that has been compressed using a compression algorithm;
determining a number of separate files into which to divide the compressed file;
dividing the compressed file into a plurality of bit sequences, wherein a length of each bit sequence corresponds to the number of separate files, and wherein one bit from each bit sequence is sequentially divided into each of the separate files;
repeating the dividing until all of the bits of the compressed file from each of the bit sequences are sequentially divided amongst the number of separate files;
determining a password for each of the separate files;
encrypting each of the separate files with its corresponding password; and
storing the encrypted files across a plurality of servers, wherein each server only includes a portion of the compressed data.

18. The non-transitory computer-readable device of claim 17, wherein the encrypting comprises:
selecting a first one of a plurality of encrypting schemes for a first one of the plurality of separate files;
selecting a second one of the plurality of encrypting schemes, different from the first encrypting scheme, for a second one of the plurality of separate files;
encrypting the first file with the first encrypting scheme; and
encrypting the second file with the second encrypting scheme.

19. The non-transitory computer-readable device of claim 17, further comprising:
generating, based on the received password, a unique password for each of the separate files; and
hashing each of the unique passwords.

20. The method of claim 1, wherein a chunk of data comprising a plurality of the sequence of bits is divided into each of the number of files.

* * * * *